United States Patent
Beck et al.

(10) Patent No.: US 6,577,602 B1
(45) Date of Patent: Jun. 10, 2003

(54) MODULE FOR OAM PROCESSING OF ATM CELLS OF A CELL FLUX ON VIRTUAL CONNECTIONS

(75) Inventors: Christoph Beck, Eichenau (DE); Dirk Amandi, München (DE); Christian Hinterberger, Holzkirchen (DE); Oliver von Soosten, München (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/529,062

(22) PCT Filed: Oct. 16, 1998

(86) PCT No.: PCT/DE98/03043

§ 371 (c)(1),
(2), (4) Date: Apr. 6, 2000

(87) PCT Pub. No.: WO99/21393

PCT Pub. Date: Apr. 29, 1999

(30) Foreign Application Priority Data

Oct. 16, 1997 (DE) .......................................... 197 45 790
Nov. 4, 1997 (DE) .......................................... 197 48 700

(51) Int. Cl.⁷ ......................... G06F 11/30; H04L 12/26
(52) U.S. Cl. ..................... 370/241.1; 370/248; 709/224
(58) Field of Search .......................... 370/241.1, 236.2, 370/248, 241; 709/223, 224

(56) References Cited

U.S. PATENT DOCUMENTS

| 5,761,191 | A | * | 6/1998 | VanDervort et al. ......... 370/232 |
| 5,764,626 | A | * | 6/1998 | VanDervort .................. 370/232 |
| 6,163,529 | A | * | 12/2000 | Nagel et al. ................. 370/244 |
| 6,198,726 | B1 | * | 3/2001 | Hayami et al. ........... 370/236.2 |

* cited by examiner

Primary Examiner—Kenneth R. Coulter
(74) Attorney, Agent, or Firm—Schiff Hardin & Waite

(57) ABSTRACT

In a module for processing ATM cells of a cell flow on virtual channels of a virtual path that is configured for the insertion of OAM-specific cells with an OAM cell generator, a cell filter and processing unit are provided to which the arriving cell stream is supplied. A connection data memory is provided in communication with the cell filter and processing unit. A scan unit is in communication with the connection data memory and to which a controller is allocated. An intermediate buffer has an input connected to the output of the OAM cell generator. A multiplexer is provided to which the output of the cell filter and processing unit as well as the output of the intermediate buffer is supplied.

12 Claims, 5 Drawing Sheets

MODULE FOR OAM PROCESSING OF ATM CELLS OF A CELL FLUX ON VIRTUAL CONNECTIONS

BACKGROUND OF THE INVENTION

A module for processing ATM cells of a cell flow on virtual channels and virtual paths that is configured for recognizing error conditions in the ATM inventory and for inserting OAM-specific cells for the generation of which an OAM generator (OZG) is provided.

ATM, the abbreviation for "asynchronous transfer mode", is a network technology that is suitable for the transport of all known signal data such as pure data, voice and video data, etc., whereby the designation ATM is occasionally employed as a synonym for B-ISDN (broadband integrated services digital network). The structuring into cells of equal length is characteristic of ATM. The information to be mediated is divided onto ATM cells, namely into packets of 53 bytes that carry a cell header (header) with 5 bytes and payload information (payload) with 48 bytes. The header information thereby identifies a specific virtual connection. In contrast to traditional time-division multiplex methods wherein time slots are allocated in advance to different types of data traffic, the incoming data traffic at an ATM interface is segmented into the 53-byte cells, and these cells are sequentially forwarded as they were generated. Further details about ATM can be derived from the literature. Let "ATM networks, concepts, protocols and applications", by Händel, Huber and Schröder, Addison-Wesley-Longman, 2nd Edition, 1994 (ISBN 0-201-42274-3) or "ATM-Solutions for Enterprise Internet Working" by D. Ginsburg be cited by way of example.

LSI circuits in ASIC components are employed for processing ATM cells. OAM modules are one example, these being utilized for the administration and processing of the OAM flows (OAM=operation administration and maintenance). OAM modules or other cell processing modules are utilized, for example, between network matching units and a switching network module or other modules. FIG. 1 is referenced in this respect, this showing a possible architecture. Physical layer modules PHY can be seen at the left and right in the Fig., these enabling the transition from a transport network, for example STM1, onto ATM. The dot-dashed lines at the left and right symbolize the boundaries between the physical layer Phy. L. and the ATM layer ATM-L. ATM modules BST are provided symmetrically relative to the switching network module SWI, these lying between the switching network module SWI and the physical layer modules PHY. Dependent on the demands and conditions, one or more ATM modules BST can be present. In order to indicate this, a respective ATM module is shown with broken lines.

As can be derived from the block circuit diagram of FIG. 1, which is relevant both for the prior art as well as for the invention, bidirectional data streams are processed, these being referenced AUF for upstream and AB for downstream. The original English names "upstream" and "downstream" in switching networks indicate the direction "up to" the switching network or, respectively, "down from" the switching network. Fundamentally, however, the designations of the two data streams as AUF and AB are arbitrary and can be interchanged. Below, the data or, cell streams arriving at a module shall be referenced ZI and the outgoing cell streams shall be referenced ZA both upstream as well as downstream. Transverse channels that are arranged at the transverse channel inputs QI as well as transverse channel outputs QA of the modules are respectively present between two modules BST for upstream and downstream.

In order to be able to control an ATM module BST, a control software is also indicated with the assistance of the block STSW in FIG. 1. It is needed for the configuration of an ATM module, for the error handling and the setup and release of connections. The control software normally runs on a commercially obtainable processor module. The control software STSW is connected to the ATM module BST via what is referred to as an interrupt signal I and a bidirectional control bus CB. The interrupt signal I serves the purpose of stopping the software in order to inform it of time-critical events that have occurred in the ATM module BST (for example, recognized error conditions).

The job of the ATM layer ATM-L that, for example, is explained in greater detail in the references cited above is to enable the transparent transfer of ATM cells via pre-established connections and it is concentrated on the data base unit, namely the 53-byte ATM cell (or "octet"). A five-layer hierarchy exists for OAM flows; this, for example, can be derived from the references and from ITU Recommendation G.610. The ATM layers F4 for the virtual path level and F5 for the virtual channel level are determinant for the present invention.

Critical jobs of the OAM flows include the error recognition, error localization and error message. Special cells are allocated to specific OAM flows; the AIS cells, the RDI cells and the CC cells shall be considered here. Error statuses in the physical layer and the ATM layer lead to error messages with the assistance of these special cells. The F4 flows and the F5 flows must thereby be handled independently of one another.

In the direction toward the end point of the connection on the channel or path, errors are signaled by the AIS cells (alarm indication signal cells), by contrast whereto the RDI cells (remote defect indication cells) serve this purpose in the direction toward the start point of a connection. When error conditions are recognized, they must be forwarded within 500 ms for all existing connections according to the ITU Recommendations G.610. A respective AIS OR RDI cell must be utilized per connection in the error status, whereby, for example, 8000 connections can be present.

In order to be able to constantly monitor the continuity of a connection, CC cells (continuity check) are utilized at the start point of a connection or of a segment, particularly when ATM user cells were not transmitted. A check can then be carried out at the end point of a connection or of a segment to see whether user or CC cells have arrived within a predetermined time interval. When this is not the case, then the corresponding connection switches into a specific error status (loss of continuity) that leads to the above-described insertion of AIS or RDI cells.

The handling of the OAM functions AIS, RDI and CC is currently essentially incremented in the software—for the purpose, too, of administering the statuses for the individual connections and the linking of these functions to one another—, whereby all incoming OAM cells are first made available to the software. The required software expense is so high that the regulations of ITU 610 cannot be adhered to in a great number of connections.

SUMMARY OF THE INVENTION

An object of the invention is comprised in more economically enabling the processing of the OAM functions and thereby keeping the overall expense for hardware and software low.

This object is achieved with a module wherein, according to the invention, a cell filter and processing unit to which the incoming cell stream is supplied, a connection data memory in communication with the cell filter and processing unit, a scan unit in communication with the connection data memory and to which a controller and a request counter are allocated, an intermediate buffer whose input is connected to the output of the OAM cell generator, a status buffer that is established for the transmission of the status information to the control software, as well as a multiplexer to which the output of the cell filter and processing unit as well as the output of the intermediate buffer are supplied. The cell filter and processing unit is configured for recognizing the cell type and for outputting cell recognition signals as well as a connection index pertaining to the respective connection to the connection data memory, and is also configured for forwarding received cells to the multiplexer dependent on the recognized cell type and the configuration data. The controller is configured for outputting a start signal for the scan mechanism to the scan unit, so that the sequential processing of all active connections by the scan unit is started at regular time intervals, whereby an interpretation of the cell recognition signals and of status signals and the generation of new or, revised status signals occurs. The scan unit (SCAN) is configured for outputting a request signal to the OAM cell generator that contains the exact type of OAM cell to be generated as well as the necessary connection data for the cell header.

The invention offers the advantage that the handling of the OAM functions, particularly the functions RDI, AIS and CC and their linkages to one another, can be implemented in the hardware. The software is merely informed of status changes via a specific interrupt signal I and the control bus CB. The OAM handling is thus not dependent on the momentary load condition of the SW. This results in the requirements according to ITU 610 always being assured even given the appearance of many error statuses and given a great number of existing connections—for example, 8000 active connections.

It is provided in an expedient embodiment that the intermediate buffer is established for outputting a hold signal to the scan unit when it fills up, as a result whereof short-term overloads can be intercepted on the part of the control software or, respectively, the cell filter and processing unit or a transverse channel.

It is recommended for the function of the scan unit when a request counter is provided that, with the assistance of a counter status signal of the scan unit, indicates the number of connections that are allowed to be successively processed, whereby the value of the request counter is lowered by 1 on demand by the scan unit after processing a connection in the current cycle.

For the purpose of a uniform distribution of processing the individual connections, it is advantageous when a cycle counter is provided whose value is set to zero when the scan unit starts, as is the value of the request counter, and the scan unit or, the block LB is configured for incrementing the value of the request counter by 1 and resetting the cycle counter to zero when the value of the cycle counter has reached an adjustable cycle duration.

In another preferred version, the multiplexer comprises a transverse channel from a module of the opposite direction.

The module of the invention is configured for processing the OAM functions AIS, RDI and CC with particular advantages in view of the processing economy.

The invention together with further advantages thereof is explained in greater detail below with reference to exemplary embodiments and the assistance of the drawings that are illustrated in the drawing [sic].

DESCRIPTION OF THE PREFERRED EMBODIMENTS

Figure 2:
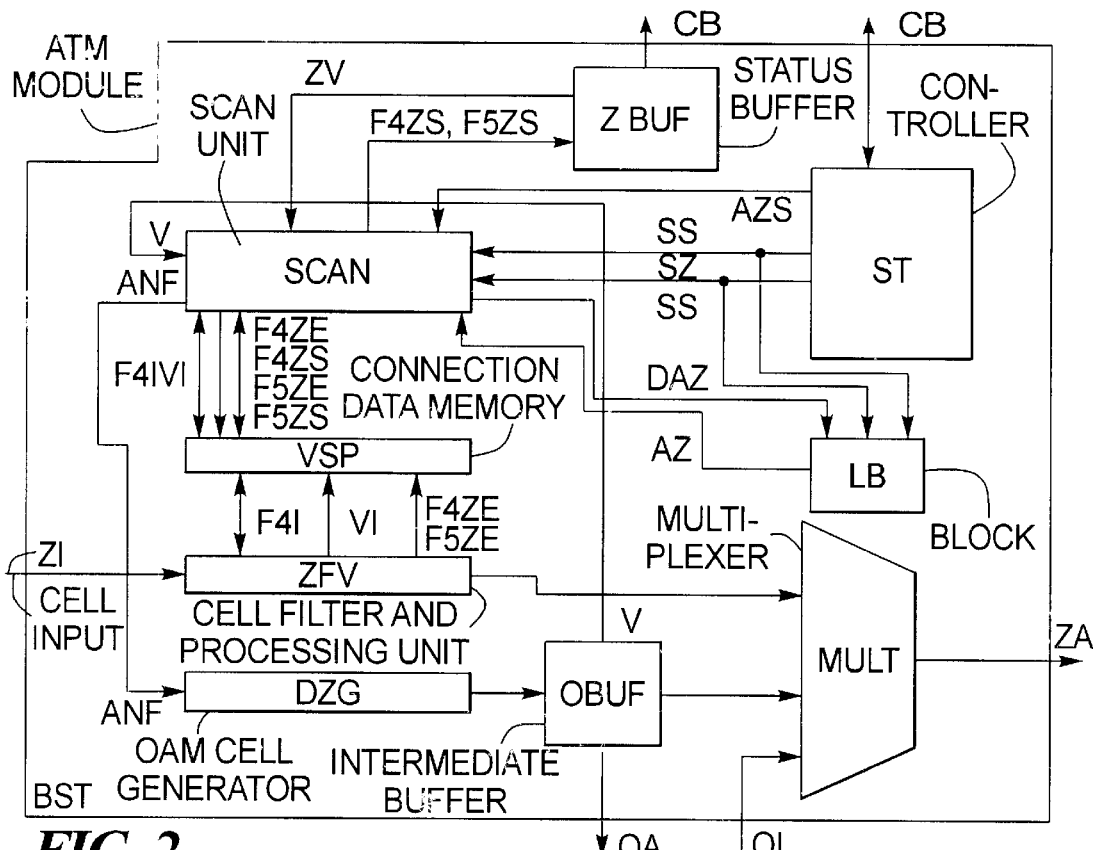
FIG. 2 shows the fundamental structure of a module of the invention.

With reference to FIG. 2, the fundamental internal structure of a module BST of the invention is set forth below. The incoming data flow ZI is supplied to a cell filter and processing unit ZFV. On the basis of the different header and of the first payload byte, this recognizes the type of cell involved, for example an F4 uses cell, F4 AIS cell, F5 AIS cell, etc.

The filter and processing unit ZFV is in communication with a connection data memory VSP that in turn serves the purpose of depositing the configuration data of a connection. What is thereby involved, among other things, is the determination as to whether it is a matter of a virtual path or of a virtual channel at the cell input ZI.

Figure 3A:
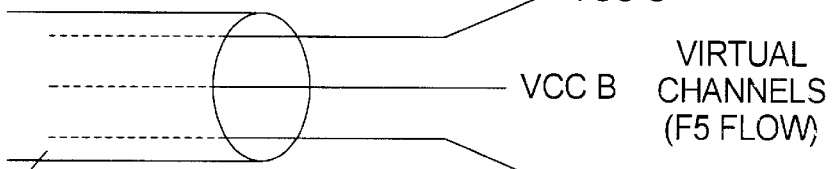
FIGS. 3a and 3b illustrates the division of the ATM layer onto the virtual path level (F4 flow) and the virtual channel level (F5 flow) with reference to an example or, respectively, the analogous structure of a connection data memory of the module according to FIG. 2.
Figure 3B:
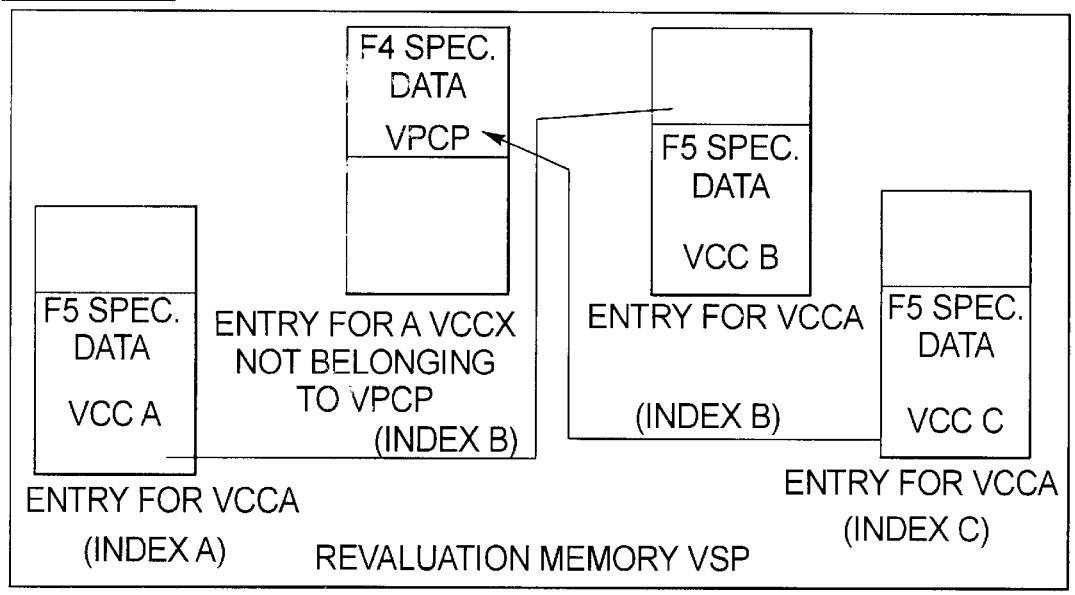

Let FIGS. 3a and 3b be referenced here, FIG. 3a thereof showing the flow structure with reference to the example of a virtual path VPC P (F4 flow) with three virtual channels VCC A, VCC B, VCC C (F5 flow) and FIG. 3b shows the structure of the connection data memory VSP based on the ATM layer structure.

A virtual path can be resolved in the module BST, and a virtual channel can be combined in this module with other channels to form a path.

Further, whether an OAM segment begins or ends is stored—with the assistance of the configuration data—in the connection data memory VSP for connection data. In order to be able to access the connection data memory VSP, each cell is first unambiguously allocated to a virtual connection. The connection-specific entry in the connection data memory VSP can be accessed with the corresponding connection index VI (FIG. 2). Since a cell processing corresponding both to the F4 as well as the F5 OAM flow must be implemented at the path end and start points, it is not only F5-specific signals that are deposited in the connection-specific entry but also an access address to F4-specific data, represented by the signal F4I in FIG. 2.

According to the recognized cell type, relevant cell recognition signals F4ZE, F5ZE are set on the F4 and/or F5 level with the assistance of the address signals VI and F4I, whereby the cell filter and processing unit ZFV merely sets these cell recognition signals, the received cell is forwarded to the input of a multiplexer MULT or is discarded.

Further, a scan unit SCAN critical for the invention is provided, this being in communication via the connection data memory VSP with the cell filter and processing unit ZFV. As illustrated, an exchange of cell recognition signals F4ZS, F5ZS as well as status signals F4ZS, F5ZS in view of the F4 and F5 flows occurs between the scan unit SCAN and the connection data memory. The scan unit SCAN thereby likewise initially makes use of the connection index signal VI, and it receives the address to the F4-specific entries—shown as signals F41 in FIG. 2—via the addressed entry in the same way as the cell filter and processing unit ZFV.

In fixed processing cycles wherein no incoming ATM cell need be processed, i.e. in free cell processing cycles, the scan unit SCAN scans all connections within a period of approximately 500 ms in which the connections must also be processed, for example a maximum of 8000 connections per 2.48 $\mu$s. When the processing duration for the cells arriving at the cell input ZI uses the entire cell processing cycle time, the scan unit can only use those processing cycles wherein no arriving ATM cell need be processed, i.e. in what are referred to as three cell processing cycles. Error conditions are thereby connection-specifically detected and administered and automatic insertion entries for AIS, RDI and CC cells are generated. During the cell processing, the corresponding flags for recognized cell types are set in the connection data memory, these being then applied in the scanning mechanism and potentially leading to the error conditions initially cited, the AIS and RDI cells serving the purpose of identifying these.

A controller ST is provided for the overall time executive sequence control of the module BST, whereby only the control signals that lead to the scan unit SCAN and to the block LB are thereby critical for the invention, namely:

A start signal SS for the scan mechanism. At regular time intervals (500 msec), it starts the sequential processing of all active connections by the scan unit SCAN and also resets the request counter AZ and the cycle counter ZZ in the block LB.

A start signal SZ for the cycle. The cycle is thereby defined by the processing time for exactly one cell that proceeds via the input ZI into the module BST.

The block LB is configured in order to realize a request counter. Like the scan unit SCAN, it is controlled by the controller ST via the signals start scan SS and start cycle SZ. The block LB in turn controls the scan unit SCAN, with the assistance of the one request counter AZ, represented by a counter status signal. The request counter AZ indicates the number of connections that the scan unit is allowed to successively process. The scan unit is only allowed to process the next connection when the value of the status signal AZ is greater than zero. The block LB de-increments the request counter by one each time when a connection was processed in the current cycle. The block LB is informed of this by the signal "de-increment request counter DAZ". On the other hand, the block LB increments the request counter and, thus, the signal AZ following an adjustable cycle (scan) period SP (see, later, FIG. 5), so that the value AZ of the request counter represents the status of a counter working according to what is referred to as the "leaky bucket" algorithm. For example, this algorithm is described in the initially cited book "ATM-solutions for enterprise Internet working".

Figure 1:
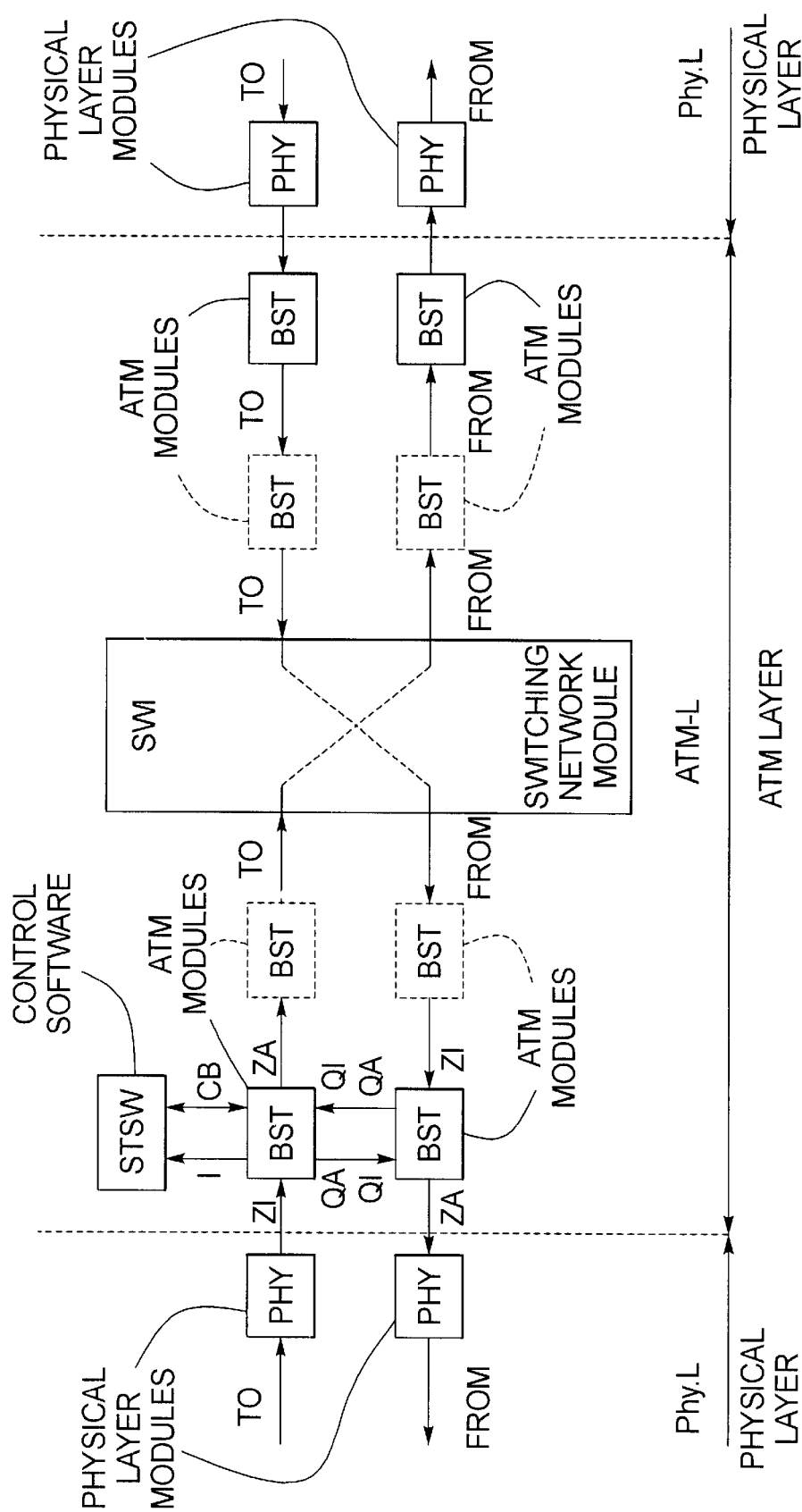
FIG. 1 is a block circuit diagram of a general ATM structure with ATM modules, the control software and with a switching network module, as already set forth above.

The module BST also contains an OAM cell generator OZG that supplies the OAM cell generator OZG that supplies the OAM cells generated in it either via an intermediate buffer OBUF to the input of the multiplexer MULT or via a transverse channel QA to the module BST for the opposite direction (see FIG. 1). The OAM cell generator OZG receives the request to generate an OAM cell from the scan unit SCAN via a signal ANF. The scan unit SCAN thereby also defines the exact type of OAM cell to be generated/F4 AIS, F5 AIS, F5 RDI, etc.) and the necessary connection data in the cell header. The transverse channel is required for the generated cells that must be sent back to the source of the ATM cell stream. The RDI cells are thereby relevant for the invention. A further input of the multiplexer MULT is connected to the output of the filter and processing unit ZFV, and a third input of the multiplexer MULT is connected to a transverse channel input QI.

The intermediate buffer OBUF can only forward cells for the multiplexer MULT when no data cells are adjacent from the cell filter and processing unit ZFV. Further, the transverse channel QA to the module BST can be blocked short-term for the opposite direction. The intermediate buffer OBUF can thus fill up. In this case, the scan unit SCAN is arrested via a hold signal V, it being thus assured that no further OAM cells are generated in the OAM cell generator OZG.

The status buffer ZBUF is filled with the status signals F4ZS and F5ZS of all connections with the assistance of the signal AZS from the scan unit SCAN on demand by the central control software. At the same time, the central control software can in turn fetch these status signals via the control bus CB in order to internally interpret them. This interpretation of the statuses does not impede further OAM handling in the scan unit SCAN (offline interpretation). The status buffer ZBUF is organized such that the stored entries are read out exactly in the sequence in which they were initially stored (FIFO principle).

Figure 5:
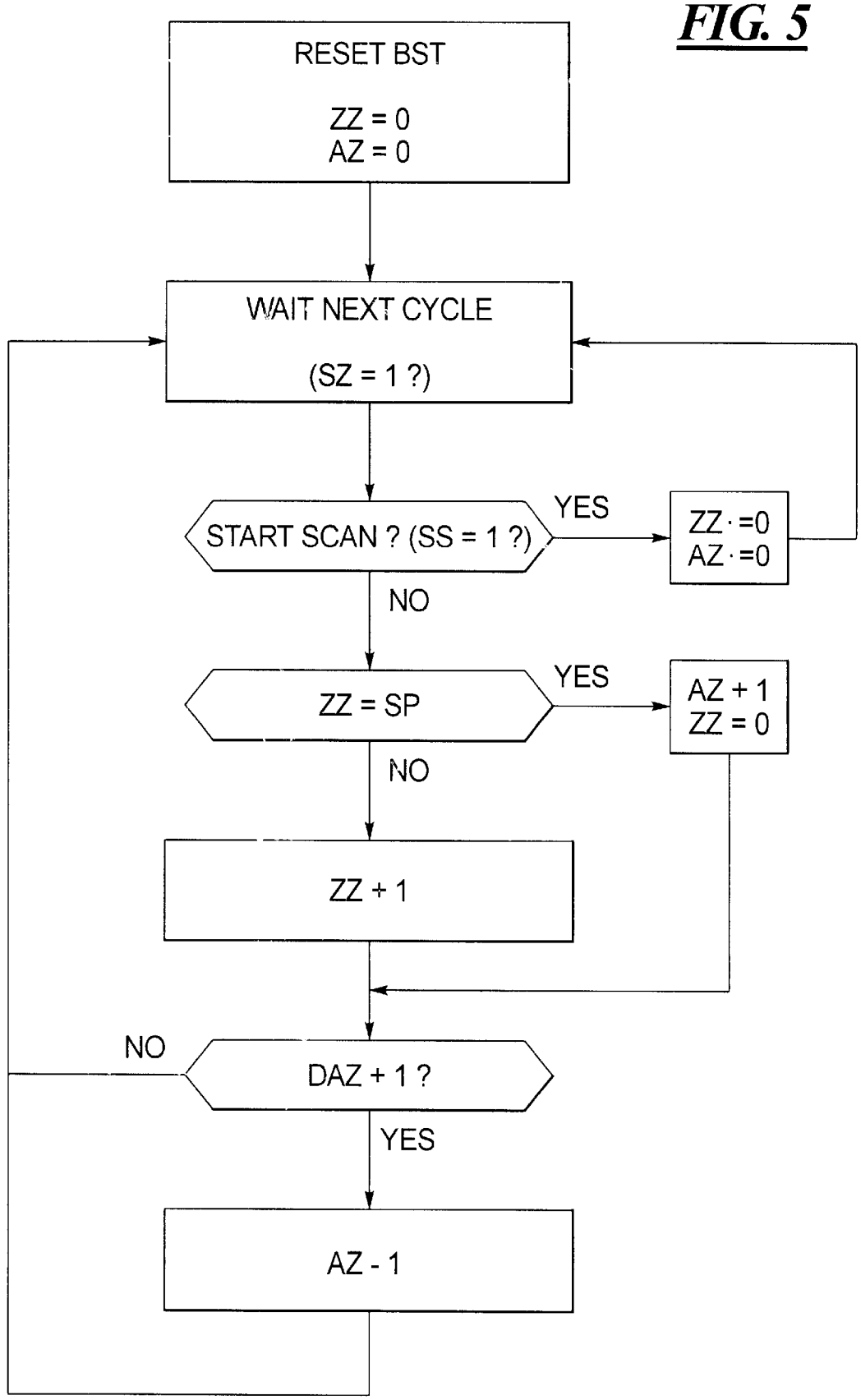
FIG. 5 illustrates a specific flow chart relating to the expansion of the method illustrated in FIG. 4 for external adherence to the reaction times required in the ITU recommendation—this is particularly significant when dummy cell cycles must be employed for the AIS, RDI and CC handling.
Figure 6:
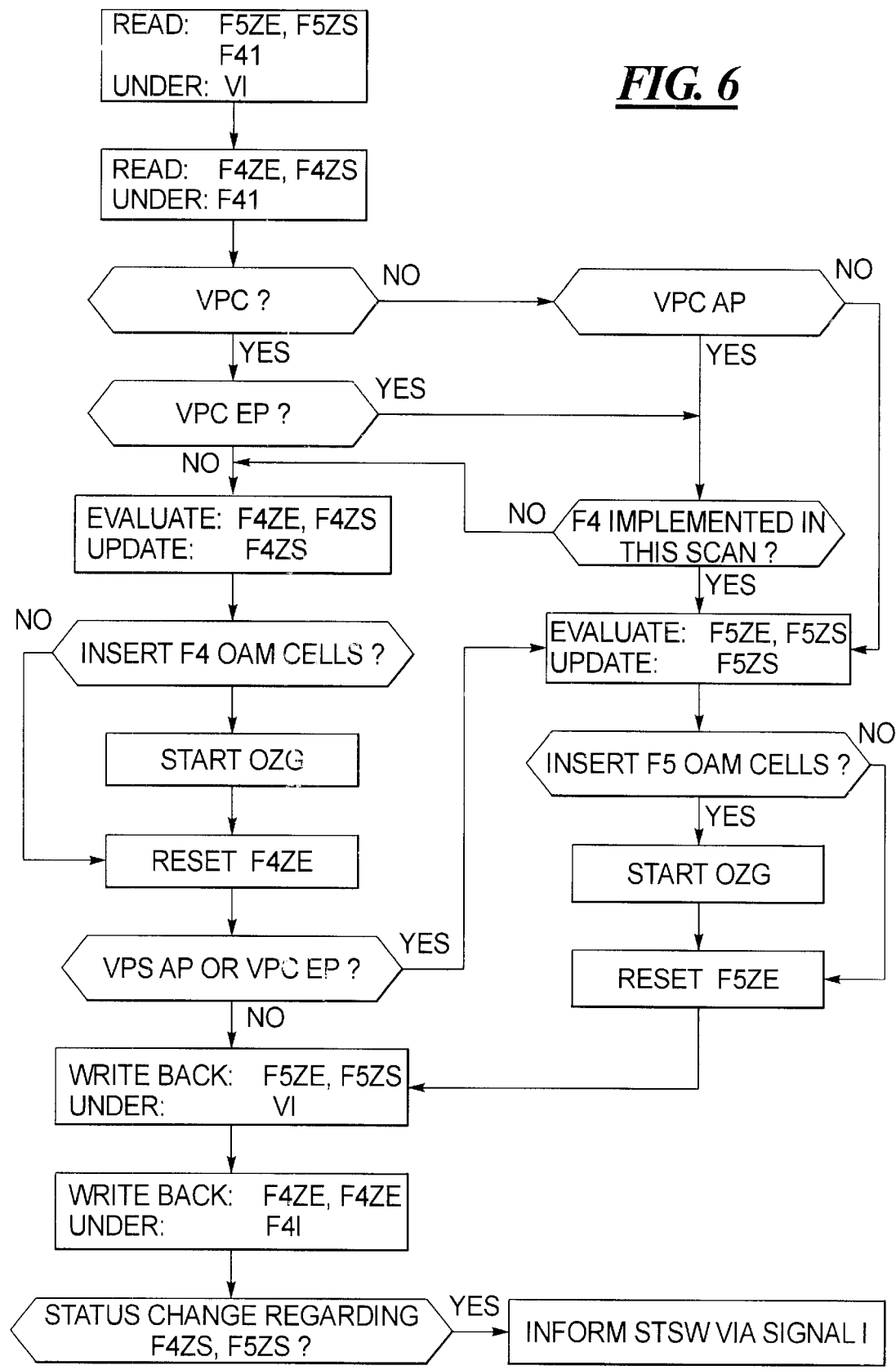
FIG. 6 is a more detailed flow chart showing a detail of the flow chart of FIG. 4 for handling the AIS, RDI and CC functions.

The scan mechanism is realized in the scan unit SCAN and is presented in greater detail below with the assistance of FIG. 4. Facultative blocks that are discussed in detail in FIG. 5 are thereby referenced with ". "" and the ASIC/RDI/CC processing function, which is shown in detail in FIG. 6, is referenced "VI".

The scan unit SCAN distinguishes two global statuses: "active" or "inactive"; the initial condition after a resetting of the module BST is thereby the inactive condition (FIG. 4, top). The scan unit SCAN is started by the controller ST at regular intervals and then switches into the active status wherein, beginning with the first connection, a processing of the AIS, RDI and CC functions is sequentially implemented according to FIG. 4, whereby exactly one connection is processed given every loop run. A loop counter (not shown in detail) is employed for this purpose, this also simultaneously referencing the connection to be processed with the connection index VI. When switching from the inactive into the active status, this loop counter is at first loaded with the first connection. Since the cell filter and processing unit ZFE and the scan unit SCAN access the same connection data memory, a consistent status must be achieved again at the beginning of each cell processing cycle. The scan unit SCAN therefore waits for the beginning of the next cycle after every loop run.

Two conditions must be met so that the processing of the functions AIS, RDI, CC is allowed to be implemented:

The intermediate buffer OBUF for the OAM cells and the status buffer dare not be full.

The value of the request counter AZ must be greater than zero (see above).

When both conditions are met, then the block LB, with the assistance of the signal DAZ, initiates that the value of the request counter be reduced by one. The AIS/RDI/CC processing is then implemented for the connection having the index VI, and the loop counter is incremented by one (Index VI+1, FIG. 4, bottom). After the processing of the AIS, RDI and CC functions, the revised status signals F4ZS and F5ZS are written into the status buffer ZBUF if the signal ST was activated. As soon as the loop counter has reached the last connection with the index VL, the scan unit SCAN is switched back into the inactive status.

The time for the processing of a fixed plurality of connections is dependent on

The filling level of the OAM intermediate OBUF and, thus—also see FIG. 2—, on the traffic load at the cell input ZI of the module as well as on the traffic load at the corresponding input of a module for the opposite direction;

The filling level of the status buffer ZBUF.

The load dependency of the processing speed, given a regular start of the scan unit SCAN, leads thereto that the time intervals when processing the same connection vary in successive scan sequences. In order to be able to adhere to the maximum reaction time to identify error conditions according to ITU, these variations should be minimized, a "leaky bucket" method being employed for this purpose, this being described with reference to FIG. 5 (and FIG. 4).

According to FIG. 5, the leaky bucket method in the block LB (FIG. 2) sets both the above-described request counter, illustrated by its index or, respectively, value AZ, as well as a cycle counter, illustrated by its index or, respectively, ZZ, to the value zero at the start of the scan unit SCAN. A loop is run for each cycle, a check being first carried out therein whether an adjustable cycle duration SP has been reached, i.e. whether ZZ=SP. When this condition is met, then the request counter is incremented by 1 and the cycle counter is reset (ZZ=0), when, in contrast, the cycle counter has not reached the adjustable period duration SP, then the value of only the cycle counter is incremented by 1. At the end, a check is carried out to see whether the signal DAZ is set: in this case, the request counter is de-incremented by 1. Given a load traffic load at the input ZI, which is to be understood that at least one dummy cell cycle occurs during SP cycles, and given a low filling level of the intermediate buffer OBUF and low filling level of the status buffer ZBUF, the processing of the AIS, RDI, and CC functions is always implemented after approximately SP cycles as a result thereof. When a higher traffic load occurs short-term at the cell input ZI or, respectively, when the intermediate buffer OBUF is overloaded short-term since extremely many OAM cells are generated but cannot be forwarded via the multiplexer MULT to the output ZA (closed cell stream) or, respectively, when the status buffer ZBUF is overloaded short-term, this can in turn be compensated by a temporarily faster processing of connections.

The processing of the functions AIS, RDI and CC shall now be explained in greater detail given the assistance of the flow chart according to FIG. 6. For the connection having the index VI, the F5 cell recognition signals F5ZE, the F5 status signals F5ZS as well as the index F4I relating to the F4-OAM handling are read in from the connection data memory VSP for connection data (uppermost field in FIG. 6).

In a second step, the F4 cell recognition data F4ZE as well as the F4 status signals F4ZS are read in for the path corresponding to the index F4I, again from the connection data memory VSP.

A determination is subsequently made as to whether the OAM functions must be implemented on a F4 and/or F5 level. This is dependent on the configuration data deposited in the connection data memory, i.e. on whether it is a matter of a path start point, a path end point, a channel start point or channel end point. The following are to be understood by OAM functions in the context of the invention:

The interpretation of the cell recognition signals F4ZE, F5ZE and of the status signals F4ZS and F5ZS, Generating the new status signals F4ZS and F5ZS, The requests ANF to the OAM cell generator OZG derived from these revised status signals (see FIG. 2), as well as Resetting the cell recognition signals F4ZE, F5ZE, Reporting one or more status transitions to the control software with the assistance of the interrupt signal I.

Figure 4:
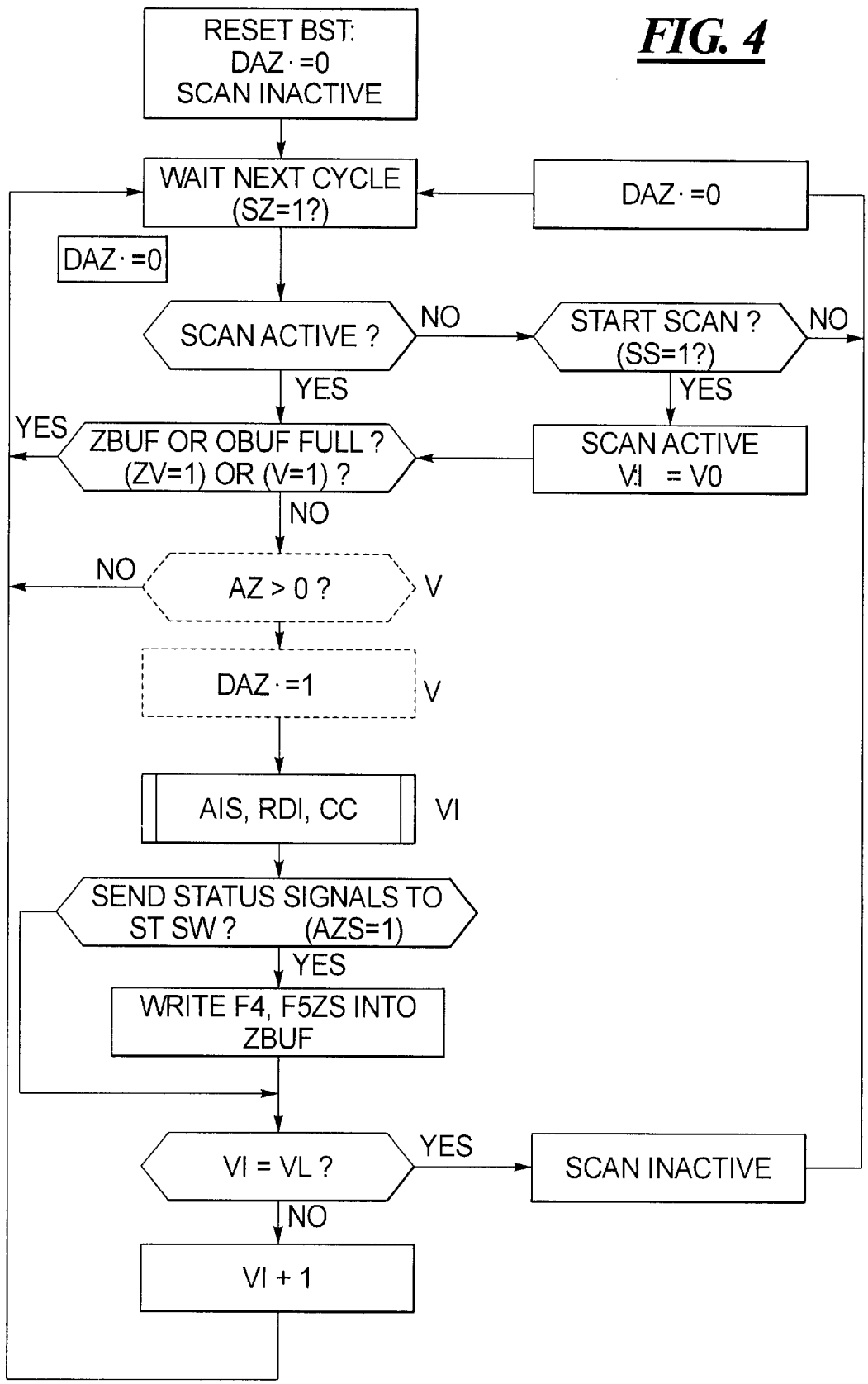
FIG. 4 shows the method of the invention on the basis of a simplified flow chart.

Four instances shown in FIG. 4 are thereby to be distinguished:

a) When the connection (index VI) is a matter of a virtual path that is not released, i.e. a virtual path (VPC) arrives at the input ZI but no VPC (virtual path connection) end point VPC-EP is present, only the F4-OAM functions need be implemented.

b) When the connection having the index VI is a matter of a virtual path (VPC) that is released in the component BST, i.e. a VPC end point VPC-EP is present, then a check must be first carried out to see whether the F4-OAM functions for this virtual path have already been implemented since the start of the scan unit SCAN. If this has not occurred, the F4-OAM functions are first implemented with the assistance of the signals F4ZE and F4ZS. In the decision as to which F5-OAM cells are to be inserted, the revised F4 status signals F4ZS must also be involved in this case. When, for example, the path is in the F4-AIS error status corresponding to the revised F4 status signals F4ZS, then F5-AIS cells are inserted.

c) When the connection at the input ZI is a matter of a virtual channel (not a VPC) that is to be combined in the module BST with other virtual channels to form a virtual path, i.e. a VPC start point VPC-AP is present, then a check must first be carried out to see whether the F4-OAM functions have already been implemented since the start of the scan unit SCAN. If this has not occurred, then the F4-OAM functions are first implemented. In any case, the F5-OAM functions are implemented in a second step with the assistance of the signals F5ZE and F5ZS. Differing from case b), the status signals F4ZS need not be taken into consideration here.

d) When, finally, the connection is a matter of a virtual channel (not a VPC) that is also further-switched or terminated as virtual channel, then only the F5-OAM functions are processed.

Finally, all signals except the configuration data are in turn written back to the corresponding locations in the connection data memory VSP, namely The cell recognition signals F5ZE and the status signals F5ZS into the connection-specific area of the memory VSP under the index VI, and The cell recognition signals F4ZS as well as the status signals F4ZE into the F5-specific area of the connection data memory VSP under F4I.

Although various minor changes and modifications might be proposed by those skilled in the art, it will be understood that our wish is to include within the claims of the patent warranted hereon all such changes and modifications as reasonably come within our contribution to the art.

What is claimed is:

1. A module for processing ATM cells of a cell flow on virtual channels and virtual paths that is configured for recognizing error statuses in an ATM inventory and for inserting OAM-specific cells, comprising:

an OAM cell generator for generation of OAM cells;

a cell filter and processing unit to which an arriving cell stream is supplied;

a connection data memory in communication with the cell filter and processing unit;

a scan unit in communication with the connection data memory and to which a controller is allocated;

an intermediate buffer whose input is connected to an output of the OAM cell generator;

a multiplexer to which an output of the cell filter and processing unit as well as an output of the intermediate buffer is supplied;

the cell filter and processing unit being configured for recognizing a cell type and for outputting cell recognition signals as well as a connection index to the connection data memory, and being also configured for forwarding received cells to the multiplexer dependent on the recognized cell type and configuration data;

the controller being configured for outputting a start signal for a scan mechanism to the scan unit so that a sequential processing of all active connections by the scan unit is started at regular time intervals, whereby an interpretation of the cell recognition signals and of status signals and generation of new or revised status signals occurs; and the scan unit being configured for outputting a request signal to the OAM cell generator that contains an exact type of OAM cell to be generated as well as necessary connection data for a cell header.

2. The module according to claim 1 wherein the intermediate buffer is configured for outputting a hold signal to the scan unit when it fills up.

3. The module according to claim 1 wherein the intermediate buffer comprises an output for a transverse channel leading to a component of an opposite direction.

4. The module according to claim 1 wherein an access address to F4-specific signals is also deposited in the connection data memory in connection-specific entries in addition to F5-specific signals.

5. The module according to claim 1 wherein the controller is configured for outputting a cycle start signal to the scan unit, whereby a cycle duration corresponds to a processing time for a cell.

6. The module according to claim 1 wherein the scan unit has a loop counter allocated to it that allocates a connection index to each connection processed in a loop.

7. The module according to claim 1 wherein a request counter is provided that, with the assistance of a counter status signal of the scan unit, indicates numbers that are allowed to be successively processed, whereby a value of the request counter is reduced by 1 after processing a connection in a current cycle.

8. The module according to claim 7 wherein a cycle counter is provided whose value is set to zero at the start of the scan unit, as is the value of the request counter, and that increments the value of the request counter by 1 and resets the cycle counter to zero if the value of the cycle counter has reached an adjustable period duration.

9. The module according to claim 1 wherein the multiplexer comprises an input for a transverse channel from a module of an opposite direction.

10. The module according to claim 1 wherein the module is configured for processing OAM functions AIS, RDI and CC.

11. The module according to claim 1 wherein for information exchange with a control software when switching into or out of an OAM error status, an interrupt signal is activated, and all OAM status signals are made available to the control software on demand by the control software with the assistance of a status buffer that the control software can access in reading fashion.

12. A module for processing ATM cells of a cell flow, comprising:

an OAM cell generator for generation of OAM cells;

a cell filter and processing unit to which an arriving cell stream is supplied;

a connection data memory in communication with the cell filter and processing unit;

a scan unit in communication with the connection data memory and to which a controller is allocated;

an intermediate buffer whose input is connected to an output of the OAM cell generator;

a multiplexer to which an output of the cell filter and processing unit as well as an output of the intermediate buffer is supplied;

the cell filter and processing unit being configured for recognizing a cell type and for outputting cell recognition signals as well as a connection index to the connection data memory, and being also configured for forwarding received cells to the multiplexer dependent on the recognized cell type and configuration data;

the controller being configured for outputting a start signal for a scan mechanism to the scan unit so that a sequential processing of all active connections by the scan unit is started at time intervals, whereby an interpretation of the cell recognition signals and of status signals and generation of new or revised status signals occurs; and the scan unit being configured for outputting a request signal to the OAM cell generator that contains a type of OAM cell to be generated as well as necessary connection data for a cell header.

* * * * *